United States Patent [19]

Inks et al.

[11] 4,277,520

[45] Jul. 7, 1981

[54] FREEZE MODIFICATION AGENT

[75] Inventors: Clyde G. Inks; John W. Compton, both of Taylor, Mich.; Kathryn M. Ellerman, Lakewood, Ohio; Lee H. Bergman, Baton Rouge, La.

[73] Assignee: BASF Wyandotte Corporation, Wyandotte, Mich.

[21] Appl. No.: 149,863

[22] Filed: May 14, 1980

[51] Int. Cl.³ .............................................. C10L 9/00
[52] U.S. Cl. .................................... 427/220; 252/70; 44/6
[58] Field of Search ...................... 427/220; 252/70; 44/6.1 R

[56] References Cited

U.S. PATENT DOCUMENTS 4,117,214  9/1980  Parks .................................... 427/220

Primary Examiner—Sam Silverberg
Attorney, Agent, or Firm—Bernhard R. Swick

[57] ABSTRACT

The strength of ice is reduced by dissolving in water prior to freezing a composition of (A) a water-soluble polyhydroxy compound or monoalkylether thereof and (B) an alkali metal carbonate in an amount to provide an effective amount of (A) plus (B). The method is especially useful for application to particulate solids, such as coal and mineral ores, which are shipped and stored in masses exposed to freezing temperatures. Any ice that is formed is physically weak and will not deter the unloading of the thusly conditioned particulate solids.

7 Claims, No Drawings 4,277,520

FREEZE MODIFICATION AGENT

BACKGROUND OF THE INVENTION

1. Field of the Invention

When the surface moisture on particulate solids freezes, the ice acts as a powerful adhesive holding the particles together in a mass. The adhesivity is influenced by both the particle size of the solids and the moisture content as shown later. For example, coal with as little as 4 percent moisture will, when frozen, cohere so strongly as to require special handling to break up the frozen mass. It thus becomes difficult to unload or dump railway cars, trucks and other conveyances used to transport coal, mineral ores and other finely-divided solids. It also makes difficult the movement of coal out of outdoor coal storage piles in a condition for fuel or other use. Unloading frozen coal from railroad cars is time consuming, can result in blocked dump chutes and can often leave as much as five tons of coal in the car. All of these factors point to the definite need of developing an economic method of treating coal, ores and other divided solids to overcome the problems of transport of those solids.

2. Description of the Prior Art

Various approaches have been used with limited degrees of success. Sodium chloride and calcium chloride salts have been added to moist coal as it is being loaded with some degree of success toward reducing the freezing problem. However, such salts contribute to the corrosion of all equipment with which the solids come in contact and are detrimental to the coking process when used with coking coal. Oil has been used to freeze-proof coal with questionable effectiveness. Oil-soluble surfactants have been added to the oil but with questionable results. Ethylene glycol has been employed, but although successful, the cost of treatment has been high.

PRIOR PATENTS

U.S. Pat. No. 4,117,214 discloses reducing the strength of ice by dissolving in water, prior to freezing, a composition of (A) a water-soluble polyhydroxy compound or monoalkylether thereof, and (B) a water-soluble organic non-volatile compound having a hydrophilic group such as amine, carboxyl, or carboxylate groups.

U.S. Pat. No. 2,716,068 relates to a combined deicing and freezing depressant substance which comprises ethylene glycol, potassium thiocyanate, and sodium nitrite.

U.S. Pat. No. 3,298,804 is directed to the prevention of freezing together of coal particles. That is accomplished with a composition of hydrocarbon and a given class of surface-active compounds.

SUMMARY OF THE INVENTION

The present invention is directed to a method for treating water such that when frozen, the resulting mass is physically weak and is not difficult to break apart. The invention is especially adapted to the treatment of moist particulate solids such that when the moisture is frozen, the mass is easily broken apart. This is done by spraying the particles with a composition of (A) a water-soluble polyhydroxy compound or monoalkylether thereof and (B) an alkali metal carbonate in an effective amount.

DESCRIPTION OF THE PREFERRED EMBODIMENT

The invention is useful with water itself and with most forms of divided moist solids, other than very finely-divided solids, e.g., 0-3 millimeters, which themselves are neither water soluble nor water swellable. Typical of such materials are coal and mineral ores such as iron and copper ore. Such solids are usually stored in piles exposed to the atmosphere and transported in railroad cars or trucks open to the environment. They thus are exposed to the rain and the other elements where they collect significant amounts of surface moisture. When the temperature drops below freezing, the particles are bound together by the ice formed at the surfaces and require mechanical and thermal means to break up the mass before loading or unloading operations.

One of the ingredients useful in the compositions employed in the present method is a water-soluble polyhydroxy compound. A preferred group is the polyhydroxyalkanes. Typical members of that class are ethylene glycol, diethylene glycol, triethylene glycol, tetraethylene glycol, dipropylene glycol, glycerine, sugar, and various mixtures thereof. The monoalkyl ethers, such as the monobutylether of ethylene glycol, are also useful.

The second material to be used in the treating of the finely-divided particles is an alkali metal carbonate, particularly sodium carbonate, sodium bicarbonate, potassium carbonate, and potassium bicarbonate.

The amount of the material incorporated in the water and the ratio of the hydroxy compound with the alkali metal carbonate may be varied within wide limits. The amount of the composition used should be that minimum needed to lower the strength of the frozen mass such that it can be easily broken. The actual amount will depend in large measure on the particle size, the amount of moisture, the condition of exposure of the particles and to some extent on the choice of materials. As a general rule, a concentration of about 0.5 weight percent of combined materials based on the moisture will suffice to achieve the objectives of the invention, although lesser amounts may also suffice in some instances. In very severe exposure conditions, somewhat more may be desired. The upper limit is determined principally by economic factors.

The ratio of the hydroxy compound to alkali metal carbonate will depend on a number of factors including those listed above for the amount of material to be used. As a general rule, the combination of ingredients will contain about 0.025 to about 0.40 parts by weight of the alkali metal carbonate for each part of polyhydroxy compound or monoalkylether thereof. Optimum selection will be readily made with simple routine experiments.

The compositions used in the treatment may also include other materials such as dyes and colorants to indicate the progress of the treatment, stabilizers and anti-oxidants and other conventionally added materials. In all cases, such an additive must be water soluble.

The compositions of this invention may be admixed with moist particulates using conventional techniques. One convenient method is to locate a spray bar above the discharge end of a loading end of a loading conveyor and another spray bar below. As the particles tumble off the conveyor, the possibility that moisture present on the particles will come into intimate contact with the spray applied composition is improved.

The invention will be illustrated with the following examples wherein all parts and percentages are by weight unless otherwise indicated.

EXAMPLES 1–6

Coal for the six examples was crushed and sized to ⅜ inch by 1/16 inch to obtain the approximate size distribution for a 3 inch diameter container. Enough coal for two examples was placed in a colander and immersed in water and drained until free water has been removed. This was repeated with the balance of the crushed and sized coal.

All the coal was spread in a thin layer on a plastic sheet for spraying with the freeze modification agent using an artist's air brush. The freeze modification agent was a still bottom waste product from the production of ethylene glycol having the following typical analysis:

| Component | Weight Percent |
|---|---|
| Ethylene glycol | 46.1 |
| Diethylene glycol | 16.0 |
| Triethylene glycol | 4.9 |
| Tetraethylene glycol | 2.4 |
| Sodium carbonate | 13.0 |
| Organic salts | 13.6 |
| Water | 4.0 |

Two equal size samples totaling one-third of the crushed and sized coal were sprayed with a sufficient amount of the above composition to give two pints per ton of coal. A second pair of equal size samples, also totaling one-third of the coal, was sprayed at a rate to give four pints per ton of coal and the third pair of samples was sprayed at a rate to give six pints per ton of coal. Each coal sample was mixed by hand and placed in a cylindrical cardboard container having a 3 inch diameter, a height of 6 inches and open at one end. The vertical side of the cylinder was cut to facilitate sample removal, rubber bands being employed to hold the cylindrical shape. The container wall was lined with plastic film to aid in removal of the sample and the container bottom was perforated to allow drainage of excess water.

Each of the six containers, containing the coal samples, was placed in a deep-freeze at -10° F. for at least 24 hours. After the initial freeze, water was sprayed on top of the coal in each cylinder in an amount of equal ½ inch of rain fall and the container returned to the freezer. To facilitate the uniform application of pressure to the top of the coal sample, an ice cap is formed on top of the coal by inverting the container in a jar cap containing water and lined with a thin plastic film. The unit was then returned to the freezer where it remained for a time sufficient to give a total freeze time of 16 days. Each sample was then removed from the container and tested in compression in an Instron Universal Test Machine, Model No. TTCM at a cross-head speed of 0.5 centimeters a minute using hydraulic pressure. The Instron strip chart shows the pressure against time on the compression test, the results of which are set forth in the table below. In the table, the cohesion index value is the pressure reading at the initial fracture of the coal sample while the relative energy index is the area under the chart curve of pressure against time. A description of the breakup for each sample is shown under comments in the table below.

TABLE

| Example | Treatment Rate pints/ton | Cohesion Index | Relative Energy Units | Comments |
|---|---|---|---|---|
| 1 | 2 | 250 | 214 | Mushroom-like break bottom ¼ residual, too firm. |
| 2 | 2 | 250 | 392 | Top half crumbled, residual core very firm. |
| 3 | 4 | 250 | 305 | Top half crumbled, residual core crumbled but firm. |
| 4 | 4 | 165 | 148 | Top ⅜ crumbled, residual crumbled fairly easily. |
| 5 | 6 | 155 | 158 | Top half crumbled, residual core crumbled easily. |
| 6 | 6 | 225 | 195 | Top half crumbled, residual core crumbled easily. |

The embodiments of the invention in which an exclusive property or privilege is claimed are defined as follows:

1. A method for treating particulate solids having surface moisture to reduce the cohesive strength of masses of said solids when frozen, said method consisting of coating such solids with an effective amount of a fluid composition comprising (A) a water-soluble polyhydroxy compound or monoalkylether thereof and (B) an alkali metal carbonate.

2. The method of claim 1 wherein said solids are coated with said fluid composition by spraying said fluid composition onto said solids.

3. The method of claim 2 wherein said component (A) is selected from the alkylene glycols and mixtures thereof.

4. The method of claim 3 wherein said fluid composition comprises about 0.025 to 0.40 part by weight of (B), alkali metal carbonate per part of compound (A).

5. The method of claim 4 wherein said alkali metal carbonate is sodium carbonate.

6. The method of claim 4 wherein said particulate solids ae coal particles and said composition is applied to said solids in amount of at least about 0.5 weight percent of (A) plus (B) based on the surface moisture on the solids.

7. The method of claim 6 wherein component (A) is a mixture of alkylene glycols and said component (B) is sodium carbonate.

* * * * *